(12) United States Patent
Beall et al.

(10) Patent No.: US 6,241,940 B1
(45) Date of Patent: Jun. 5, 2001

(54) METHOD FOR PRODUCING CERAMIC BODIES

(75) Inventors: Douglas M. Beall, Painted Post, NY (US); Devi Chalasani, San Diego, CA (US); Christopher J. Malarkey, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/320,938

(22) Filed: May 27, 1999

Related U.S. Application Data
(60) Provisional application No. 60/088,342, filed on Jun. 6, 1998.

(51) Int. Cl.$^7$ .................................................. B28B 3/22
(52) U.S. Cl. .................... 264/630; 264/669; 264/670; 264/177.12
(58) Field of Search ................................. 264/630, 669, 264/670, 177.12

(56) References Cited

U.S. PATENT DOCUMENTS

| | | | |
|---|---|---|---|
| 4,680,154 | 7/1987 | Matsubara et al. | |
| 5,019,537 | 5/1991 | Kato et al. | 501/1 |
| 5,344,799 | 9/1994 | Wu | 501/80 |
| 5,538,681 | 7/1996 | Wu | 264/432 |
| 5,568,652 | 10/1996 | Wu | 419/2 |
| 5,678,165 | 10/1997 | Wu | 419/37 |
| 6,080,345 | * 6/2000 | Chalasani et al. | 264/109 |

FOREIGN PATENT DOCUMENTS

| | | |
|---|---|---|
| 0 650 944 | 3/1995 | (EP) . |
| 0 714 867 | 6/1999 | (EP) . |
| 4-341787 | 11/1992 | (JP) . |
| 99 07652 | 2/1999 | (WO) . |
| 99 10294 | 3/1999 | (WO) . |

* cited by examiner

Primary Examiner—Christopher A. Fiorilla
(74) Attorney, Agent, or Firm—Timothy M. Schaeberle

(57) ABSTRACT

A binder system for use in the formation of ceramic or other powder-formed greenware including a binder, a solvent for the binder, a surfactant, and a component that is non-solvent with respect to the binder and solvent. The non-solvent component exhibits a lower viscosity than the solvent when containing the binder and includes a low molecular weight oil having a 90% recovered distillation temperature range of between about 220 to 400° C. Also disclosed is a process of forming and shaping plasticized powder mixtures and a process for forming ceramic articles utilizing the binder system.

15 Claims, 2 Drawing Sheets

METHOD FOR PRODUCING CERAMIC BODIES

This application claims the benefit of U.S. Provisional Application No. 60/088,342, filed Jun. 6, 1998, entitled "Binder System for Honeycomb Ceramic Bodies and a Method for Producing Honeycomb Bodies", by Beall et al.

BACKGROUND OF THE INVENTION

1. Field of the Invention

The present invention generally relates to a binder system for use in the field of forming ceramics or ceramic bodies and a method of producing ceramics or ceramic honeycomb bodies utilizing such a binder system. More particularly, the invention is concerned with a binder system that contains a low molecular weight oil-based non-solvent and the use of the binder system in a method for producing ceramic honeycomb bodies.

2. Discussion of the Related Art

Binders and binder systems useful for the manufacture of products from powdered materials, e.g., from particulate ceramic materials, must meet a number of requirements. For example, the binder and binder systems must be compatible with the ceramic material such that a flowable dispersion comprising a relatively high loading of the ceramic material in the binder may be provided. In addition, the "green" preform produced by shaping the dispersion of ceramic powder in the binder should have reasonable strength such that it can be handled. For desirable "burnout" or removal of the binder, the binder should be removable from the shaped ceramic part without incurring distortion or breakage of the part. Furthermore, the binder-free preform should have at least a minimum level of strength, yet be sufficiently free of binder residues that defect-free consolidation is readily achievable.

The formulation of binders meeting these requirements is complex and a large number of different binder formulations have been disclosed in the prior art. Recently, cellulose ether binders have been favored for use in the forming articles of various shapes; i.e., honeycomb substrates. The mixtures are intimately blended and homogeneous and result in the green body having good integrity in size and shape, as well as uniform physical properties. In addition to the binders, these powder mixtures typically include certain organic additives, including for instance, surfactants, lubricants, and dispersants and function as processing aids to enhance wetting thereby producing a uniform batch.

Recently, there has been an increase in the demand for thinner walled, higher cell density cellular structures, complex shaped product, and products having a large frontal area. Thin walled and complex shaped products that are produced, utilizing the current binder technology, i.e., cellulose ether binders, are extremely difficult to handle without causing shape distortion because of the low strength of the "green" preform. One solution/recent trend in the extrusion technology, especially for multicellular honeycomb bodies, comprised of highly filled ceramic powder mixtures, is to extrude a stiffer body without causing proportional increase in pressures. However, attempts to extrude stiffer ceramic batches with the current batch components; i.e., use of the aforementioned cellulose ether binder coupled with the lowering the amount of water and/or including additives such as sodium tallowate or sodium stearate, have been largely unsuccessful because of the higher extrusion pressures resulting from collision of finer particles, and the abrasiveness of the materials involved.

Another attempted solution is to utilize rapid-setting techniques; i.e., solidifying the cell walls of the honeycomb quickly after forming, therefore ensuring that the dimension of the greenware will not be altered in subsequent cutting and handling steps. Prior rapid stiffening methods involve time-delayed stiffening using rapid set waxes as disclosed, for example in U.S. Pat. No. 5,568,652, and/or applying an external field such as an RF field at the die exit. Although these rapid-stiffening methods involve the extrusion of soft batches, which historically, for highly filled ceramic mixtures, have lead to better extrusion quality, these methods have not been overly successful for thin walled cellular structures.

A recent solution disclosed in co-assigned U.S. Pat. App., Ser. No. 60/069,637 (Chalasani et al.) involves a powder mixture, for forming honeycomb structures, that includes inorganic powder materials, binder, solvent for the binder, surfactant, and a component which is non-solvent with respect to the binder, solvent and powder materials. This powder mixture is mixed, plasticized and shaped to form a green ceramic preform body having improved wet green strength and is thus especially suitable for use in the processing of thin walled honeycomb structures. Furthermore, Chalasani discloses a preferred aqueous binder system mixture that includes water, cellulose ether and a hydrophobic non-solvent.

While this Chalasani reference provides significant advances in the capability of the art to form complex, thin-walled ceramic honeycomb bodies through extrusion, the inclusion of this non-solvent in the powder, e.g., light mineral oil, results in additional complications in the "burn-out" or removal of the binder. Specifically, it is difficult to remove the binder components from the shaped ceramic part without incurring distortion or breakage of the part. Because of the reduced strength of the thin-wall ceramic honeycomb bodies and the corresponding increase in the dimensional changes during binder removal due to the exothermic nature of the removal of the oil, special considerations in the firing of the ceramic honeycomb must be undertaken to avoid cracking of the ceramic body. Specially designed kilns, apparatus for volatile removal, reduced oxygen containing atmospheres and increased, complicated firing cycles are among the numerous means that have been employed to reduce the differential shrinkage and high cracking frequency experienced during the firing of thin-walled ceramic honeycomb bodies which incorporate the aforementioned binder.

In light of the foregoing inconveniences experienced in the art, there remains a need to develop a binder system which permits a thin-walled ceramic body to be formed and fired into a desired ceramic article without high differential shrinkage and incidences of cracking or defects and which can be quickly and easily removed from the ceramic body.

SUMMARY OF THE INVENTION

It is therefore an object of the present invention to provide a binder system capable of use in forming ceramic or other inorganic honeycomb bodies which results in a sufficiently high wet strength of the formed green body with at least a portion of the binder system capable of being removed without generating a large exothermic reaction as a result of removal during the firing process, thereby reducing the incidences of cracking and the amount of differential shrinkage during firing.

The above object of the invention may be achieved according to the invention that provides a binder system for use in the formation of ceramic or other powder-formed greenware, comprising the essential components of a binder component, a solvent for the binder component, a surfactant component, and a component that is non-solvent with respect to the binder and solvent components. The non-solvent component exhibits a lower viscosity than the solvent when containing the binder and comprises a low molecular weight oil having a 90% recovered distillation temperature range of between about 220 to 400° C.; i.e., low molecular weight oil.

According to another embodiment of this invention, there is provided a moldable powder batch comprised of an inorganic powder component, consisting of a sinterable inorganic particulate material, and the aforementioned binder system.

According to another embodiment of the invention there is provided a method for forming and shaping plasticized powder mixtures comprising compounding an inorganic powder component consisting of a sinterable inorganic particulate material mixture and the inventive binder system and thereafter plasticizing the components to form a plasticized mixture and then shaping the plasticized mixture to form a green body.

According to a final embodiment of the invention there is provided a method of making ceramic articles comprising the aforementioned steps of forming and shaping the inorganic powder and binder system composition and thereafter involving the additional step of heating this ceramic green body, having the desired shape, so as to remove the binder system and to fire the formed ceramic body thereby resulting in a fired ceramic body.

An advantageous feature of the binder system is that it is useful for producing cordierite honeycomb structures having thin walls and a large number of cells. Specifically, the resulting so-formed wet green body exhibits a high degree of stiffness necessary to avoid slump in ceramic honeycomb structures with very thin walls; those having a thickness less than 150 μm. An additional benefit of this invention is that firing cracks associated with previous binder systems are reduced, while still maintaining the extrusion benefits of the previous binder systems. Specifically, the low molecular weight oils, utilized in the present invention, exhibit a lower exothermic intensity associated with their removal when compared to previously utilized oil based non-solvent components.

BRIEF DESCRIPTION OF THE FIGURES

For a better understanding of the invention, reference is made to the attached drawings, wherein.

DETAILED DESCRIPTION OF THE INVENTION

Figure 1:
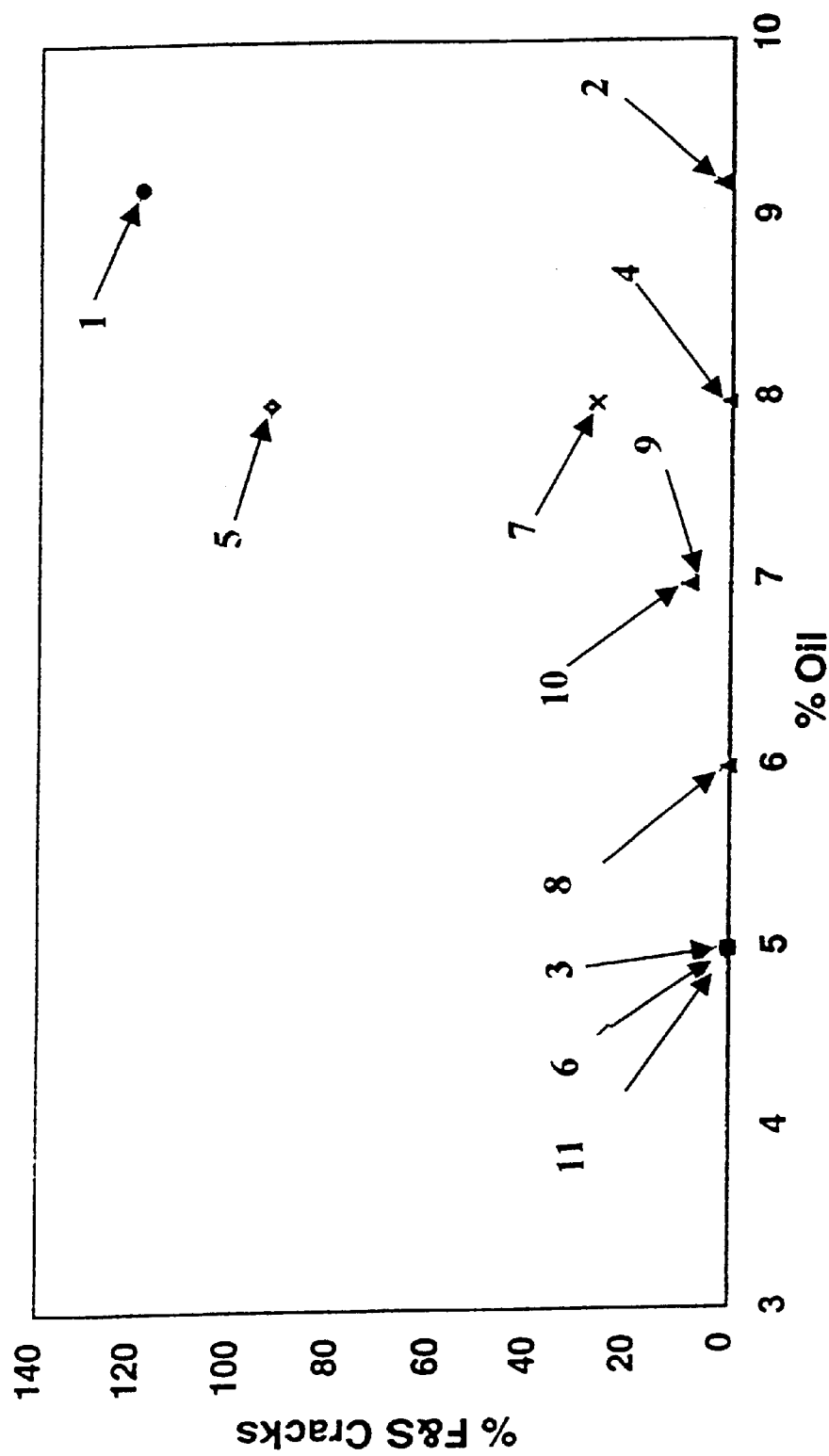
FIG. 1 is a graphical illustration showing the reduced face and side crack percentage for ceramic bodies incorporating the inventive binder system incorporating a low molecular weight oil, when compared to ceramic bodies containing binder systems incorporating an oil-based non-solvent.

According to the invention a binder system for use in the greenware processing steps of a subsequently fired ceramic or other inorganic body includes the following components, a binder, a solvent for the binder, a surfactant, and a component which is non-solvent with respect to at least the binder and solvent components. The non-solvent is a low molecular weight oil which exhibits both a lower viscosity than the binder when containing the solvent and a 90% recovered distillation temperature range of between about 220 to 400° C., preferably about 220 to 320° C., and more preferably about 220 to 280° C.; hereinafter referred to as the low molecular weight oil.

The low molecular weight oil still functions like that described in the aforementioned Chalasani application. In short, the low molecular weight oil replaces a portion of the solvent and does not contribute to plasticity, but provides the fluidity necessary for shaping while still allowing the batch to remain stiff. As such, the instant binder system achieves the same desired increase in the wet green strength over that achieved with conventional binders, without proportional increases in the processing difficulty. In other words, the binder system of the instant invention allows for the extrusion of a stiff batch without adversely processing performance such as the extrusion pressure, torque and flow characteristics.

Typical oil-based non-solvents, as disclosed previously in the aforementioned Chalasani application, provide a major benefit of shape retention for thin walled ceramics in the wet green state. However, these immiscible fluid/aqueous based highly filled ceramic systems are relatively difficult to fire without resultant cracking. Cracking of the parts is due, in part, to the difficulty in removing large amounts of the standard oil-based fluids typically used as the non-solvent, along with other organics present in the system, at relatively high temperatures (150–500° C.). Removal of the these organics comprises a sequence of simultaneous reactions which are fairly complex, including, for example, oxidation, volatilization, and thermal degradation of the organics. Because of the binder burnout phenomena associated with the use of these standard oil-based, non-solvent components containing binder systems, the honeycomb parts exhibit large thermal gradients and drastic dimensional changes. Use of a binder system incorporating a low molecular weight oil as the non-solvent component is superior to any of the previously disclosed standard non-solvent containing binder systems, including those disclosed in the aforementioned reference. This inventive binder system provides the benefit that the low molecular weight oil in the binder system, is removed by means of volatilization, a far less exothermic firing reaction than those required by to remove standard oil-based, non-solvent component containing binder systems. As a result of the removal means required for this inventive binder system, green bodies incorporating the inventive binder system will exhibit a reduced exotherm during the firing which will likely lead to reduced cracking of the subsequently formed honeycomb ceramic bodies.

The requirement that the low molecular weight oils exhibit a 90% recovered distillation temperature range between about 220–400° C., as measured as measured by, and defined in ASTM D86, ensures that the oil will exhibit an exothermic burnout associated with its removal that is far less intense than that for standard oil-based fluids typically used as the non-solvent; e.g. light mineral oil. Generally, low molecular weight oils are oils which consist of predominantly branched or straight chain saturated on unsaturated hydrocarbons exhibiting carbon chain lengths having distributions between the range of 14 to 24; preferably, at least 70% of the carbon chain length distributions, and more preferably 90% of the carbon chain length distributions are within the range of between 14 to 24. A desirable characteristics that the low molecular weight oil should exhibit is the ability to maintain its liquid nature during the forming/extrusion process. Additionally the low molecular weight oil should exhibit a solubility parameter according to the following Hansen parameters, as defined by Allan F. M. Burton in the "Handbook of Solubility Parameters and Other Cohesion Parameters", CRC Press, pp 95–111, $2^{nd}$ ed., 1991: (1) a dispersion parameter, $\delta_D$, ranging between about 12 to 20, preferably between about 14 to 19; (2) a polarity parameter, $\delta_P$, of less than or equal to 2, preferably less than or equal to 1; (3) a hydrogen bonding parameter, $\delta_H$, of less than or equal to 4, preferably less than or equal to 2; and (4) a total parameter, $\delta_T$, ranging between about 12 to 20, preferably between about 14 to 19.

Acceptable non-solvent low molecular weight oils include polyalpha olefins, light mineral oils exhibiting the requisite 90% recovered distillation temperature and linear alpha olefins.

The preferred binders used in this invention are aqueous based, that is, capable of hydrogen bonding with polar solvents. Acceptable binders for use in the present invention, are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M cellulose products from Dow Chemical Co. Methocel A4M cellulose is a methylcellulose. Methocel F4M, F240, and K75M cellulose products are hydroxypropyl methylcellulose.

The properties of preferred cellulose ether binders such as methylcellulose are water retention, water solubility, surface activity or wetting ability, thickening of the mixture, providing wet and dry green strength to the green bodies, thermal gelation and hydrophobic association in an aqueous environment. Cellulose ether binders that promote hydrophobic association with the non-solvent and hydrogen-bonding interaction with the solvent are desirable. Examples of substituent groups that provide hydrophobic association with the non-solvent are methoxy, propoxy, and butoxy groups. These substituents which provide the hydrophobic association also contribute to the gel strength of the binder. The substituent groups that maximize the hydrogen bonding interaction with polar solvents e.g. water, are hydroxypropyl and hydroxyethyl groups, and to a smaller extent hydroxybutyl groups. This combination of properties enables binders to be at the interface between the solvent and non-solvent.

Acceptable solvents for use in the inventive binder system should be aqueous based and provide hydration of the binder component and the inorganic particulate component. Particularly preferred, as the solvent is water or water-miscible solvents.

Acceptable surfactants for use in the inventive binder system include, for example, $C_8$–$C_{22}$ fatty acids and/or their derivatives, $C_8$–$C_{22}$ fatty esters, $C_8$–$C_{22}$ fatty alcohols, stearic, lauric, linoleic, palmitoleic acids, stearic acid in combination with ammonium lauryl sulfate, with stearic lauric and oleic being particularly preferred.

A particularly preferred binder system embodiment comprises a binder component comprising a cellulose ether selected from the group consisting of methylcellulose, methylcellulose derivatives, and combinations thereof, a non-solvent comprising polyalpha olefin, a surfactant selected from the group consisting of, stearic acid, ammonium lauryl sulfate, lauric acid, oleic acid, palmitic acid and combinations thereof and water as the solvent water.

The present invention is not restricted to ceramic batch formulations but has general application to powder forming processes; i.e., to the forming of products or preforms for products from essentially any particulate sinterable inorganic material which is available in or convertible to a finely divided form. Powder formed materials for which this invention is suitable include particulate ceramics, including crystalline ceramic materials, glasses in particulate form, and crystallizable glasses (glass-ceramics By ceramic, glass ceramic and glass ceramic powders what is meant are those materials as well as their pre-fired precursors. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, soda barium borosilicate or mixtures of these, as well as others.

Although the binder system offers substantial advantages in conventional inorganic forming processes it provides unique processing advantages for ceramic materials, especially those that yield cordierite, mullite, or mixtures of these on firing, some examples of such mixtures being about 2% to about 60% mullite, and about 30% to about 97% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

A particularly preferred ceramic material and one which ultimately forms cordierite upon firing is as follows in parts by weight, assuming 100 parts by weight: about 33 to about 41, and most preferably about 34 to about 40 parts of aluminum oxide, about 46 to about 53 and most preferably about 48 to about 52 parts of silica, and about 11 to about 17 and most preferably about 12 to about 16 parts magnesium oxide.

In the practice of the present invention, a moldable powder batch composition comprising the binder system and an inorganic powder component consisting of a sinterable inorganic particulate material, e.g., a ceramic powder material, can be prepared by using the components in any desired amounts selected.

In a preferred embodiment, the composition comprises 100 parts by weight of the inorganic powder, about 2 to 50 parts by weight of the low molecular weight oil component, about 0.2 to 10 parts by weight of the surfactant, about 2 to 10 parts by weight of the binder, and about 6 to 50 parts by weight of the solvent component.

In a particularly preferred embodiment, the composition comprises 100 parts by weight of the inorganic powder, about 5 to 10 parts by weight of the low molecular oil, about 0.2 to 2 parts by weight of the surfactant, about 2.5 to 5 parts by weight of the binder, and about 8 to 25 parts by weight of the solvent component.

The individual components of the binder system are mixed with a mass of the inorganic powder material, e.g., the ceramic powder material, in a suitable known manner, to prepare an intimate mixture of the ceramic material and the binder system. For example, all components of the binder system may be previously mixed with each other, and the mixture is added to the ceramic powder material. In this case, the entire portion of the binder system may be added at one time, or divided portions of the binder system may be added one after another at suitable intervals. Alternatively, the components of binder system may be added to the ceramic material one after another, or each previously prepared mixture of two or more components of the binder system may be added to the ceramic powder material. Further, the binder system may be first mixed with a portion of the ceramic powder material. In this case, the remaining portion of the ceramic powder is subsequently added to the prepared mixture. In any case, the binder system must be uniformly mixed with the ceramic powder material in a predetermined portion. Uniform mixing of the binder system and the ceramic powder material may be accomplished in a known kneading process at an elevated temperature.

Particularly, in the case of batches for ceramic products, the batch formation takes place in two stages prior to the shaping step. In the first stage or wetting stage of batch formation, the inorganic powder particles, surfactant, and the binder component are dry mixed followed by addition of the solvent such as in a Littleford mixer. The solvent is added in an amount that is less than is needed to plasticize the batch. With water as the solvent, the water hydrates the binder and the powder particles. The low molecular weight oil is then added to the mix to wet out the binder and powder particles. The low molecular weight oil has lower surface tension than water. As a result, it wets out the particles much more readily than the solvent. At this stage, the powder particles are coated and dispersed by the surfactant, solvent, and low molecular weight oil.

In a preferred embodiment the plasticization takes place in the second stage. In this stage the wet mix from the first stage is sheared in any suitable mixer in which the batch will be plasticized, such as for example in a twin-screw extruder/mixer, auger mixer, muller mixer, or double arm, etc.

The resulting stiff batch is then shaped into a green body by any known method for shaping plasticized mixtures, such as e.g. extrusion, injection molding, slip casting, centrifugal casting, pressure casting, dry pressing, etc. The invention is best suited for extrusion through a die.

The extrusion operation either vertical or horizontal, can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

The prepared ceramic green body is then fired at a selected temperature under suitable atmosphere and for a time dependent upon the composition, size and geometry so as to result in a fired body of the desired ceramic. For example, for a composition which is primarily for forming cordierite, the temperatures typically range from about 1300 to about 1450° C. with the holding times at these temperatures ranging from about 1 hour to 8 hours. Firing times and temperatures depend upon factors such as kinds and amounts of materials and the type of equipment utilized, but typical total firing times range between about 20 to 80 hours.

The benefits resulting from the use of the inventive binder system are similar to those described in the aforementioned copending, co-assigned application detailing the use a non-solvent in the forming and shaping of ceramic green bodies. Specifically, those advantages include: (1) shaping, e.g. extrusion can be done at significantly lower temperatures, approximately at least about 25% lower, than was achieved by conventional binder systems; (2) lower temperature processing and thus lower mixing torques, which in turn enables extrusion at higher feed rates, (at least 2 times, and generally about 2–2.5 times higher) than those enable by conventional binder systems, while still maintaining product quality; (3) processing involving cellulose ether binders utilizing water as the solvent which produce higher gel strengths at higher throughputs and lowered heating rates of the ceramic batch mixture when compared to conventional batches where the higher throughput capability was achieved through the use of cellulose ethers with low gel strength and resultant drying blisters during dielectric drying; (4) extrusion process benefits of cell orthogonality at the perimeter of the shaped body, as well as a smooth skin; and, (5) good retention of shape after exiting the die, and specifically, in the case of multicellular structures, an improvement of the cell orthogonality at the perimeter of the part closer to the skin.

As described above, this method exhibits many of the same advantages, e.g., increased wet strength and increased extrusion speeds, of the aforementioned non-solvent binder system disclosed in the copending application, however, as described above, inherent in the use of these standard oil-based non-solvents and other conventional binder systems is that during firing, large exotherms associated with non-solvent burnout have resulted in differential shrinkage and cracking. The instant binder system overcomes this shortcoming of the previous binders by incorporating a low molecular weight oil exhibiting a 90% recovered distillation temperature of between about 220 to 320° C., as the non-solvent component. The main benefits the instant binder system exhibits over the previous binder systems, including previous non-solvent containing ones, include the following: (1) the removal of the binder system being removed via a reaction exhibiting a reduced exotherm, which reduces the occurrence of cracking or defects during firing and thus permits the easy formation of fired bodies; (2) the use of the low molecular weight oil lowers the amount of fluid/binder that needs to be removed during firing; (3) the low viscosity of the low molecular weight oil, slightly higher than that of water, and lowered surface tension in certain compositions, i.e., the use of appropriate surfactants, lowers the mixing torques during extrusion, and exhibits minimal deformation/maximum stiffness enhancement; (4) the dimensional changes exhibited during firing by bodies incorporating the inventive binder system resemble those of a green body with no oil-based fluid; and (5) the instant binder system can be easily removed at a comparatively higher rate and accordingly allows for an increased productivity of fired bodies.

The instant invention is thus suitably applied to the fabrication of complicated formed bodies, especially ceramic, that are usually formed by extrusion, and to the manufacture of the corresponding fired bodies such as multicellular ceramic honeycomb structures having a high cell density and exhibiting thin cell wall dimensions.

EXAMPLES

To further illustrate the principles of the invention of the present invention, there will be described several examples of the binder system according to the invention. However, it is to be understood that the examples are given for illustrative purpose only, and the invention is not limited thereto, but various modifications and changes may be made in the invention, without departing from the spirit of the invention.

Examples 1–11

Various inorganic powder batch mixtures suitable in the formation of a cordierite ceramic body are listed in TABLE I; as listed in parts by weight. Each of compositions 1–11 were prepared by combining and dry mixing together the components of the designated inorganic mixture as listed in TABLE I; Y and Z differ in the ratio of the fine and coarse alumina that are utilized in the alumina component. An amount of the binder system listed in TABLE II is then added to each of the inorganic dry mixtures and thereafter further mixed to form a plasticized ceramic batch mixture. Two of the eleven compositions have been included for comparison purposes. Each of these 11 different plasticized ceramic batch mixtures comprised 100 parts by weight of the inorganics powder batch mixture and differing amounts, up to 35.9 parts by weight, of the binder system components as detailed in TABLE II. TABLE III lists the various non-solvent (i.e., various types of oils) components utilized in the Examples; represented by designations A–F. The carbon chain distribution and the 90% recovered distillation temperature, 95% recovered for Durasyn 162, of these non-solvents are listed are reported Table III. Note that non-solvents A, C and D each comprise a low molecular weight oil exhibiting predominately carbon chain lengths of a range between 14 and 24 and a 90% distillation temperature of at least greater than 220° C.; the 95% recovered distillation temperature of 230° C. of the Durasyn 162 corresponds to a 90% recovered distillation temperature of greater than 220° C.

Each of the various plasticized mixtures were extruded through a twin screw extruder to form ceramic honeycomb substrates exhibiting a diameter of 5.66", a cell wall size of 5.5 mils and a length of 4"; composition 10 is the exception which exhibited a diameter of 4.162", a cell wall size of 4 mils, and a length of 4.5". The conditions maintained during extrusion included an extrusion pressure range of 150–170 kg and an extrusion temperature range of 23–25° C. Approximately 90 ceramic honeycomb green bodies were formed from each of the 11 batch compositions and each of the 90 ceramic honeycombs for each of the 11 compositions were subjected to a heating and firing cycle sufficient to remove the organic binder system from, and to sinter, the honeycomb substrates. The total number of face and side cracks for each of the 11 firings (one total for each of the compositions) were counted. The total number of face and side cracks for each composition was then divided by the total number of substrates fired for that composition to arrive at a face and side crack percentage value for the composition; that number is recorded in TABLE II as %.

TABLE I

| INORGANIC COMPONENTS | INORGANIC COMPOS. | | |
| --- | --- | --- | --- |
| | X | Y | Z |
| TALC | 40.79 | 40.67 | 40.67 |
| CLAY | 41.82 | 26.81 | 26.82 |
| ALUMINA | 15.40 | 22.29 | 22.30 |
| SILICA | 2.00 | 10.24 | 10.22 |

TABLE II

| COMPOSITION NO. | INORGANIC COMPOSITION | F240 METHOCEL | STEARIC ACID[1] | NON-SOLVENT | | WATER | % |
| --- | --- | --- | --- | --- | --- | --- | --- |
| | | | | TYPE[2] | AMOUNT | | |
| 1 | X | 2.7 | 0.6 | F | 9.2 | 23.4 | 119 |
| 2 | X | 2.7 | 0.5 | A | 9.2 | 23.4 | 2 |
| 3 | Y | 2.7 | 0.8 | A | 5.0 | 21.5 | 0 |
| 4 | X | 2.7 | 0.5 | A | 8.0 | 23.4 | 0 |
| 5 | X | 2.7 | 0.6 | B | 8.0 | 22.9 | 93 |
| 6 | Y | 2.7 | 0.8 | D | 5.0 | 21.4 | 0 |
| 7 | Y | 3.2 | 0.6 | E | 8.0 | 22.8 | 2 |
| 8 | X | 2.9 | 0.7 | A | 6.0 | 24.2 | 0 |
| 9 | Z | 3.2 | 0.5 | A | 7.0 | 21.3 | 8 |
| 10 | Z | 3.2 | 0.5 | C | 7.0 | 20.5 | 11 |
| 11 | Z | 2.9 | 0.8 | C | 5.0 | 22.2 | 0 |

[1]COMPOSITION 1 UTILIZED AN INDUSTRENE 9018 STEARIC ACID WHILE THE STEARIC ACID OF COMPOSITIONS 2–13 COMPRISED EMORSOL E-120, BOTH STRAIGHT CHAIN STEARIC ACID
[2]SEE TABLE III

TABLE III

| OIL DESIGNATION | OIL TYPE | CARBON CHAIN DISTRIBUTION | 90% RECOVERED DISTILLATION TEMPERATURE (° C.) |
| --- | --- | --- | --- |
| A | AMOCO CHEMICALS DURASYN 162 | (90% C20, 10% C30) | 230[1] |
| B | AMOCO CHEMICALS DURASYN 164 | (84% C30, 15% C40, 0.5% C50,) | 468 |
| C | PENNZOIL PENRECO 2260 | (0.2% C11–C12, 4.6% C13–C14, 41.1% C15–C16, 51.8% C17–18, 1.9% C19–C20, 0.5% C21–C22 | 300.6 |
| D | PENNZOIL PENRECO 6970 | (2% C15–C16, 3.6% C17–C18, 20.9% C19–C20, 53% C21–C22, 18.7% C23–C24) | 390 |
| E | Oil Associates OA-60T | C15–C27 | 369 |
| F | Oil Associates OA-372 | C18–C36 | 462 |

[1]95% Recovered Distillation Temperature

An examination of the crack values reported in TABLE II reveal that the use of the low molecular weight oil, Durasyn 162 or Penreco 2260/6970, as a component of the binder system, produces fired honeycomb substrates which exhibit a face and side crack percentage of nearly zero, even in compositions containing up to 9.2 parts by weight oil. Comparing inventive composition 4 with comparison-compositions 5 and 7, all containing 8 parts oil in the binder system, it can be seen the 0% face and side crack percentage for composition 4 compares favorably to the crack percentages for compositions 5 and 7, which are 93 and 2.0% respectively. The face and crack reduction effect is even more substantial in those compositions utilizing 9.2 parts oil in the binder system; composition 2 exhibits a 2% face and crack percentage value while composition 1 exhibits a value of 119%. This reduction in crack percentage effect exhibited by the inventive low molecular weight oil containing binder system compositions is more clearly illustrated in FIG. 1; the composition designations corresponding to the designations of Table I.

Figure 2:
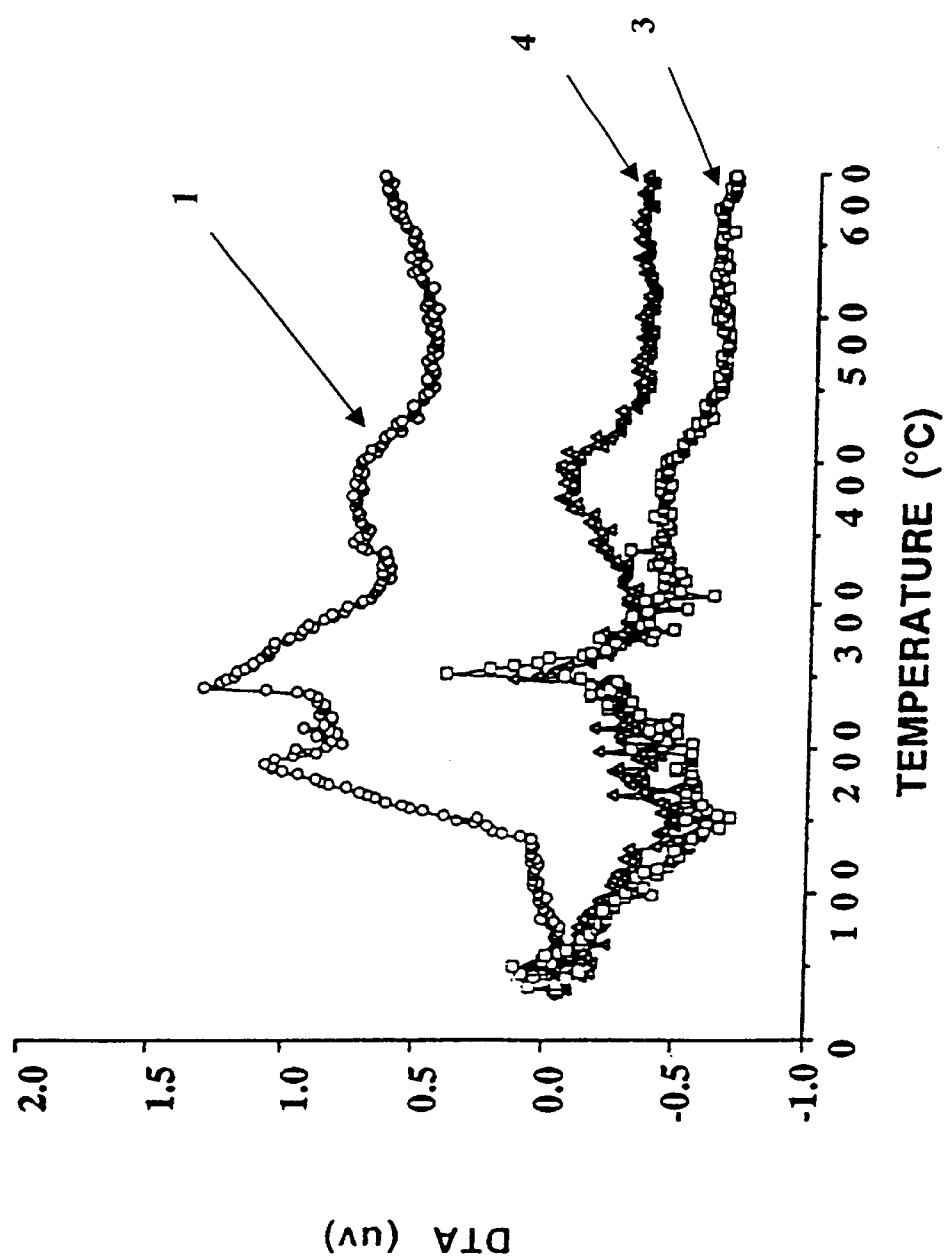
FIG. 2 is a graphical illustration comparing the exothermic intensity of the removal of the inventive binder system with the exothermic intensity of associated with the removal of a binder system containing a standard oil-based non-solvent component.

The reduced cracking during firing of honeycomb ceramic substrate bodies incorporating the inventive batch system, when compared to those incorporating conventional oil-containing binder systems is, as described above, due to the fact that the organics in the binder system, the low molecular weight oil, exhibits a much less intense exothermic reaction upon removal from the green body during the firing. This evaporation and reduced exothermic condition is supported by the data that appears in FIG. 2 that plots DTA results of three of the compositions of above. The data plotted in FIG. 2 reveals that the composition incorporating standard oil-containing, i.e., light mineral oil, binder systems, composition 1, exhibits a substantial exotherm over the temperature range of 100–500° C. This should be contrasted to the plots of compositions 3 and 4 which reveal that the binder system, upon removal, exhibits an endothermic reaction between 100–200° C., followed by a slightly exothermic reaction in the 200–300 temperature range. This FIG. suggests that the binder system of compositions 3 and 4 are removed by evaporation followed by a period of volatilization as opposed to the pyrolysis which appears to be the mechanism of removal for composition 1. It should be noted that the plots of compositions 3 and 4 resemble those expected for standard green bodies incorporating standard binder systems containing simply a binder component, solvent for the binder component and a surfactant; e.g., methylcellulose, water and stearic acid.

We claim:

1. A method for forming and shaping plasticized powder mixtures comprising:

compounding components comprising an inorganic powder component consisting of a sinterable inorganic particulate material mixture, and a binder system comprising a binder component, a solvent for the binder component, a surfactant component, and a component which is non-solvent with respect to at least the binder and solvent components and which exhibits lower viscosity than solvent when containing the binder, the non-solvent component comprising a low molecular weight oil having a 90% recovered distillation temperature of between about 220 to 400° C.

mixing and plasticizing the components to form a plasticized mixture; and, shaping the plasticized mixture to form a green body.

2. The method of claim 1 wherein the low molecular weight oil exhibits a 90% recovered distillation temperature of between about 220 to 320° C.

3. The method of claim 1 wherein the low molecular weight oil exhibits a 90% recovered distillation temperature of between about 220 to 280° C.

4. The method of claim 1 wherein the mixing and plasticizing involves the dry-mixing the inorganic powder mixture, the surfactant and the binder to form a uniform dry blend mixture, adding the solvent to the resulting dry blend mixture to form an intermediate plasticized mixture and thereafter adding the non-solvent to the intermediate plasticized mixture to form the plasticized mixture.

5. The method of claim 1 wherein the plasticized mixture comprises 100 parts by weight of the inorganic powder, about 2 to 50 parts by weight of the non-solvent, about 0.2 to 10 parts by weight of the surfactant, about 2 to 10 parts by weight of the binder, and about 6 to 50 parts by weight of the solvent.

6. The method of claim 1 wherein the plasticized mixture comprises 100 parts by weight of the inorganic powder, about 5 to 10 parts by weight of the non-solvent, about 0.2 to 2 parts by weight of the surfactant component, about 2.5 to 5 parts by weight of the binder component, and about 8 to 25 parts by weight of the solvent component.

7. The method of claim 1 wherein the shaping is done by passing the mixture through a twin screw extruder and then through a die to form a green honeycomb structure.

8. A method of making ceramic articles comprising:

forming and shaping into a green body a composition for the manufacture of ceramics, the composition comprising an inorganic powder component consisting of a sinterable inorganic particulate material, and a binder system comprising a binder, a solvent for the binder, a surfactant, and a component which is non-solvent with respect to at least the binder and solvent components and which exhibits lower viscosity than solvent when containing the binder, the non-solvent component comprising a low molecular weight oil having a 90% having recovered distillation temperature of between about 220 to 400° C.; and, firing the resulting formed and shaped green body to form a fired body.

9. The method of claim 8 wherein the low molecular weight oil exhibits a 90% recovered distillation temperature of between about 220 to 320° C.

10. The method of claim 8 wherein the low molecular weight oil exhibits a 90% recovered distillation temperature of between about 220 to 280° C.

11. The method of claim 8 wherein the forming involves mixing and plasticizing involves the dry-mixing the inorganic powder mixture, the surfactant and the binder to form a uniform dry blend mixture, adding the solvent to the resulting dry blend mixture to form an intermediate plasticized mixture and thereafter adding the non-solvent to the intermediate plasticized mixture to form the plasticized mixture.

12. The method of claim 8 wherein the plasticized mixture comprises 100 parts by weight of the inorganic powder, about 2 to 50 parts by weight of the non-solvent, about 0.2 to 10 parts by weight of the surfactant, about 2 to 10 parts by weight of the binder, and about 6 to 50 parts by weight of the solvent.

13. The method of claim 8 wherein the plasticized mixture comprises 100 parts by weight of the inorganic powder, about 5 to 10 parts by weight of the non-solvent, about 0.2 to 2 parts by weight of the surfactant, about 2.5 to 5 parts by weight of the binder, and about 8 to 25 parts by weight of the solvent.

14. The method of claim 8 wherein the shaping is done by passing the mixture through a twin screw extruder and then through a die to form a green honeycomb structure.

15. A method of making ceramic articles comprising:

forming and shaping into a green body a composition for the manufacture of ceramics, the composition comprising an inorganic powder component consisting of a sinterable inorganic particulate material, and a binder system comprising a binder, a solvent for the binder, a surfactant, and a component which is non-solvent with respect to at least the binder and solvent components and which exhibits lower viscosity than solvent when containing the binder, the non-solvent component comprising a low molecular weight oil having a 90% having recovered distillation temperature of between about 220 to 400° C. and a measured DTA value over the temperature range of 0–500° C. of less than 1.0 uv ; and, firing the resulting formed and shaped green body to form a fired body.

* * * * *